United States Patent [19]

Plihal

[11] 4,159,573
[45] Jul. 3, 1979

[54] APPARATUS FOR MANUFACTURING THE PARTS OF ROTARY VESSELS

[75] Inventor: Karel Plihal, Brno, Czechoslovakia

[73] Assignee: Prvni Brnenska strojirna, narodni podnik, Brno, Czechoslovakia

[21] Appl. No.: 891,348

[22] Filed: Mar. 29, 1978

[30] Foreign Application Priority Data

Mar. 31, 1977 [CS] Czechoslovakia ............... 2136-77

[51] Int. Cl.² .................... G01B 3/14; G01B 5/20; B23Q 3/00
[52] U.S. Cl. .................... 33/174 G; 33/1 G; 33/21 R; 33/180 R; 29/281.5; 29/464; 29/705
[58] Field of Search ............ 33/1 D, 1 F, 1 G, 21 R, 33/21 B, 174 G, 174 Q, 180 R, 189; 269/319, 321 W, 303, 307; 29/464, 468, 705, 281.1, 281.5

[56] References Cited

U.S. PATENT DOCUMENTS

| 223,372 | 1/1880 | Miner | 33/174 G |
| 2,474,149 | 6/1949 | Hurne | 33/21 B |
| 2,564,364 | 8/1951 | Kane | 33/21 B |
| 2,873,519 | 2/1959 | Milne | 29/464 |
| 4,068,359 | 1/1978 | Bunker | 29/281.1 |

FOREIGN PATENT DOCUMENTS 505557 9/1951 Belgium ...................... 33/174 Q

Primary Examiner—Richard R. Stearns
Attorney, Agent, or Firm—Burgess, Ryan and Wayne

[57] ABSTRACT

An apparatus is disclosed for manufacturing parts for cylindrical vessels comprising a supporting structure having adjustable bearing and stop elements for positioning prefabricated and shaped segments.

3 Claims, 5 Drawing Figures

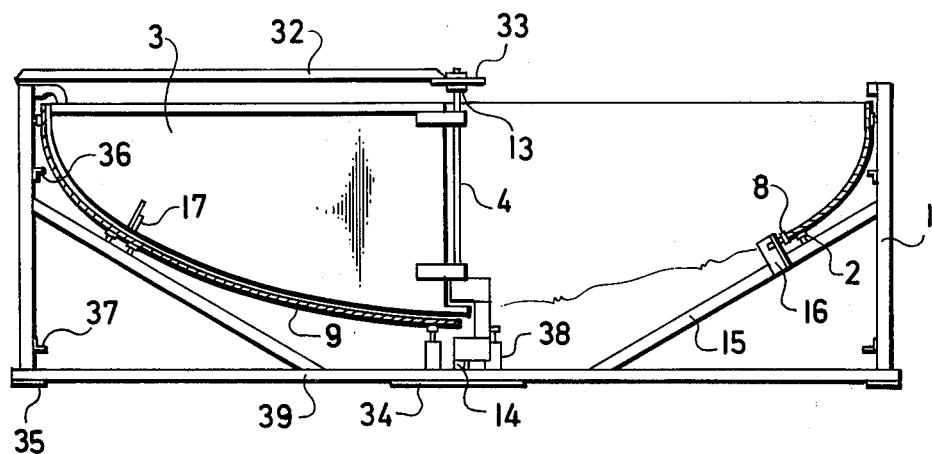

APPARATUS FOR MANUFACTURING THE PARTS OF ROTARY VESSELS

This invention relates to a device for manufacturing parts of cylindrical (i.e. rotary surface solids) vessels.

Dished heads for large pressure vessels are difficult to manufacture. The heads are made from a large number of shaped segments. The shaped segments are generally fabricated to dimensions which include an allowance for working. Since it is not practical to prefabricate the segments to the exact dimensions, it is necessary to mark the exact dimensions along the edge of the prefabricated segment according to dimensions required. The exact marking of the preformed segment is difficult in practice because the edges of the prefabricated segment often conform to complex curves. It is also difficult to mark the prefabricated segment so that the form and the dimensions of the manufactured segment exactly correspond to the marking template. At the present time, workers utilize various improvised aids to attempt to improve the sizing of the prefabricated segments. Various improvised aids such as templates, fillers and supports are used. Due to the complexity of the task and the use of improvised aids the manufactured segments are inexact, the form and dimension of manufactured vessel is not fabricated to the proper dimensions, and the work is slow and challenging.

According to the invention there is provided a device for manufacture of parts of cylindrical vessels, especially of cylindrical pressure vessel parts of large dimensions, wherein the middle part of the supporting structure is provided with bearing and stop elements for positioning of prefabricated and shaped segmental elements of cylindrical vessel manufactured parts. There is provided a pivoted and removably arranged template, the angular positions of which in regard to the supporting structure are adjustable through an indexing means adapted partly on the above mentioned template and partly on the mentioned supporting structure.

Preferably the axle of the template is in the middle part of the supporting structure which consists of individual peripherally adapted supporting sections. The template is pivoted in the bearings in a recess and overhangs the preformed segments of the cylindrical vessel head.

A device may have the bearing elements fixed on the supporting structure of the device and be adjustably adapted to be equidistant from the surface of revolution, generated by the functional edge of the template revolving about the axle. The functional edge of the template is a meridian cross-section of the head of the cylindrical vessel.

A specific embodiment of the invention will now be described by way of example with reference to the drawing in which:

FIG. 1 is a vertical axial cross-section A—A (taken on FIG. 2) of a device adapted for manufacture of dished bottoms of cylindrical vessels;

FIG. 2 is the plan view of a device;

Figure 3:
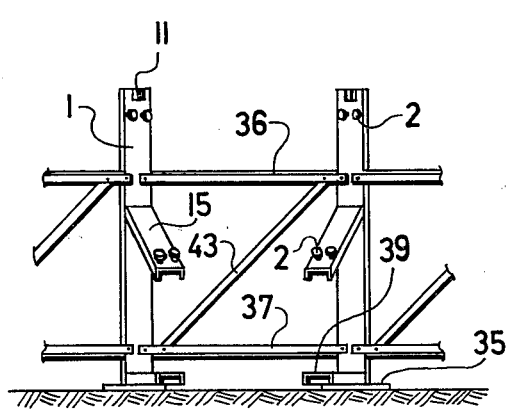
FIG. 3 is the partial view in direction B on one section of the device.

A device for manufacture of heads of cylindrical vessels is shown which consists of a supporting structure in the form of a regular dodecagon prism. The supporting structure consists of setting and stop elements fixed on the beams of each supporting section. The template 3 is pivoted on vertical axle 4 arranged in the middle part of the supporting structure. The axle 4 overhangs the end of the prefabricated segment of the manufactured head of a cylindrical vessel. The axle 4 is provided with an offset on its lower end which is pivoted in the bearing 14, fixed on the lower base 34 to which are fitted radial arms 39 of the individual sections. The lower end of axle 4 in the bearings 14 is adapted for simple axial removal. The upper end of the axle 4 is pivoted in bearing 13, fitted in bearing plate 33 mounted on three radial bearing arms 32. The peripheral ends of these bearing arms 32 are withdrawably fitted to columns 1 of the supporting sections.

Figure 4:
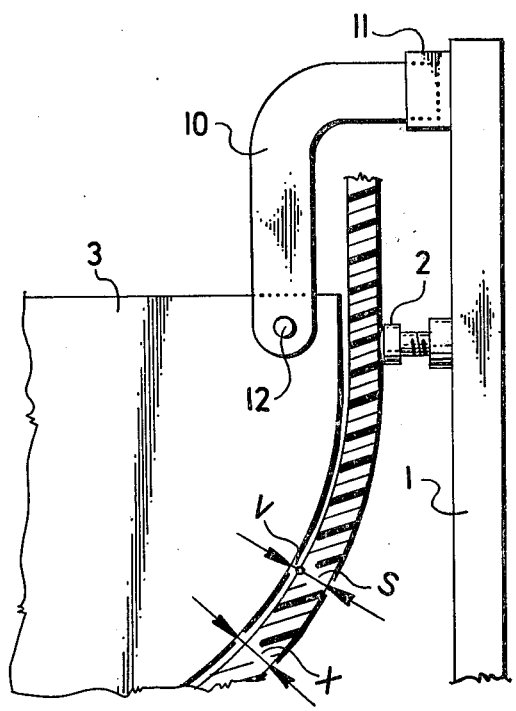
FIG. 4 shows the vertical partial cross-section C—C (taken on FIG. 2) of a device.
Figure 5:
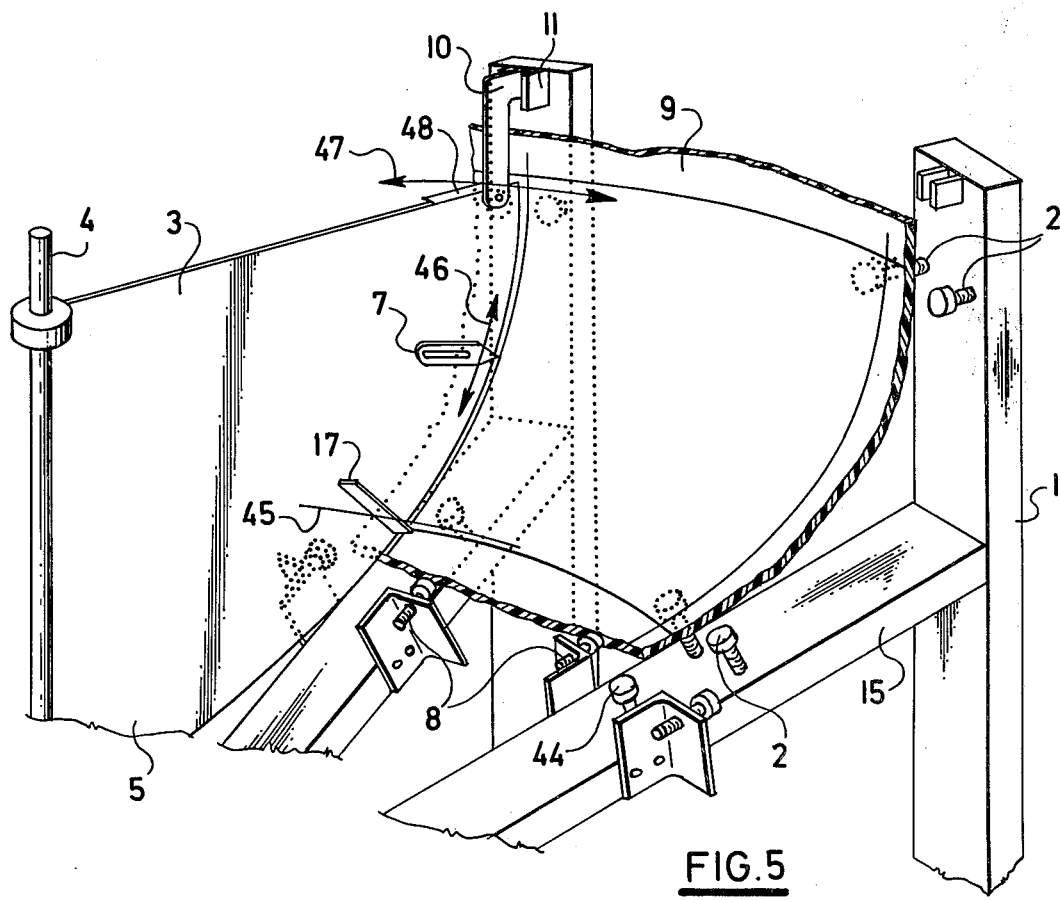
FIG. 5 is the axonometric view on one section of the device.

Columns 1 of adjoining supporting sections of the supporting structure are peripherally connected with upper stiffeners 36, lower stiffeners 37 and with diagonal stiffeners 43. Columns 1 are fitted to lower base 34 by arms 39. The lower ends of the columns 1 are mounted to the peripheral ends of arms 39 and have attached feet 35, which lower the specific head on the ground. Diagonals 15, connect the middle parts of the columns 1 with middle parts of the base arms 39 and radially stiffen the connection of the parts in the supporting sections of the supporting structure. There are arranged on diagonals 15 bearing stop elements which serve to stabilize twelve peripheral segments 20, 21, 22, 23, 24, 25, 26, 27, 28, 29, 30, 31 and two internal segments 18, 19, which form the segmental bottom 9 of the manufactured pressure vessel. For tangential positioning of external segments 20, 21, 22, 23, 24, 25, 26, 27, 28, 29, 30, 31 of the preformed bottom 9 with regard to the template 3 removable rests 16 with adjusting stop screws 8 are attached to the diagonals 15. For the normal adjustment and control of positioning of any external segments 20, 21, 22, 23, 24„ 25, 26, 27, 28, 29, 30, 31 with regard to the template 3 four bearing screws 2 are adjustably attached to diagonals 15 and to columns 1. Tangential positioning of internal segments 18, 19 is achieved by means of two stop screws 40, which are adjustably mounted in removable rest 42 exchangeably mounted with regard to axle 4 arranged on couplings 41 of adjoining diagonals 15. The normal adjustment and the control of the position of any internal segments 18, 19 is accomplished partly by four bearing screws 44, which are adjustably mounted on the diagonals 15 and one bearing screw 44, which is adjustably mounted on base 38 which is mounted on lower base 34. According to FIG. 4, the size of clearance v between the internal surface of the segmental bottom 9 and the functional edge 5 of the template 3 is a measure of the position accuracy of the individual preformed segments. With a uniform thickness s and the correct preforming of the segments the clearance v is an excellent indicator of keeping an equidistant distance x between the functional edge 5 of the template 3 and the external surface determined in the drawing. It is therefore an indicator of the high demensional accuracy of the manufactured part of a cylindrical vessel. Precise adjustment of the bearing screws 2 and 44 is done at successive slight-turning of the template 3 with an unillustrated gauge adjusted to size of space v. The template 3 is fixed at repeated and reproducible angular positions by indexing means, which consist of a catch 10 pivoted on the pin 12 fixed in upper peripheral corner of the template 3 which is adapted to engage forks 11 fixed at a corresponding height on the front surfaces of the columns 1. To the upper peripheral corner of the template 3 is attached a rest 48, which serves for resting the pen 7 with peripheral marking out the external peripheral edges of external segments 20, 21, 22, 23, 24, 25, 26, 27, 28, 29, 30, 31 in sense of arrows 47. Mounted on template 3 is a rest 17, which serves as a stop for the pen 7 with peripheral marking out of the peripheral edges of internal segments 18, 19 and the internal peripheral edges 45 of the external segments 20, 21, 22, 23, 24, 25, 26, 27, 28, 29, 30, 31 in sense of arrows 47. During any peripheral drawing the indexing gear is released and the template 3 turns around its axle 4. Meridian marking-out of the preformed segments of segmental bottom 9 in the sense of the arrows 46 is carried out by stiffening of the indexing gear with meridian motion of the pen 7 placed against the template 3.

A device according to the invention makes it possible to mark out, cut and connect the peripherally unclosed parts of the cylindrical vessels as e.g., their elbow and reducing parts. For the repeated manufacture of such peripherally unclosed parts of cylindrical vessels a device according to the invention can also have an unclosed, e.g., elbow form. The middle part of such modified device contains space, in which is arranged axis 4 of the template 3.

What is claimed is:

1. An apparatus for manufacturing parts for cylindrical vessels comprising a supporting structure provided with adjustable bearings and stop elements for positioning preformed curved sections of sheet material, a template defining a profile corresponding to the desired shape of a portion of the cylindrical vessel pivotably and removably mounted on said structure by means of an axle, the angular positions of said template in relation to the supporting structure being adjustable by means of angular position indexing means carried by said supporting structure and said template.

2. The apparatus of claim 1 wherein the axle of the template is in a central part of the structure and is provided with an offset portion in a base portion of the axle so that the axle can overhang a portion of a preformed section.

3. The apparatus of claim 1 wherein the axle of the template is supported on a bearing which is adapted so that the rotation of the functional edge of the template forms a surface of revolution equidistant from the side of a meridian cross section of a part of the cylindrical vessel.

* * * * *

UNITED STATES PATENT AND TRADEMARK OFFICE
CERTIFICATE OF CORRECTION

PATENT NO. : 4,159,573
DATED : July 3, 1979
INVENTOR(S) : Karel Plihal

It is certified that error appears in the above—identified patent and that said Letters Patent is hereby corrected as shown below:

Column 3, line 4: after "marking out" insert --of--.

Column 4, line 1: "axis" should be --axle--.

Signed and Sealed this

Twelfth Day of February 1980

[SEAL]

Attest:

SIDNEY A. DIAMOND

Attesting Officer     Commissioner of Patents and Trademarks